US009156334B1

(12) United States Patent
Robins et al.

(10) Patent No.: US 9,156,334 B1
(45) Date of Patent: Oct. 13, 2015

(54) VEHICLE BODY STRUCTURE

(71) Applicant: Nissan North America, Inc., Franklin, TN (US)

(72) Inventors: Erik Robins, White Lake, MI (US); Sarah Verner, Brighton, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/319,058

(22) Filed: Jun. 30, 2014

(51) Int. Cl.
*B60J 1/20* (2006.01)
*B60R 7/04* (2006.01)
*B60R 21/08* (2006.01)
*E06B 9/264* (2006.01)

(52) U.S. Cl.
CPC ............. *B60J 1/2094* (2013.01); *B60R 7/04* (2013.01); *B60R 21/08* (2013.01)

(58) Field of Classification Search
CPC ......... E06B 7/084; E06B 7/086; E06B 7/088; E06B 9/26; E06B 9/264; E06B 9/28; E06B 9/36; E06B 9/368; E06B 2009/285; B60J 1/2088; B60J 1/2094; B60R 21/02; B60R 21/06; B60R 21/08; B60R 21/23138; B60R 21/232; B60R 2021/0246; B60R 2021/0273; B60R 2021/028; B60R 7/04; F41H 5/06; F41H 5/16; F41H 5/18
USPC ........... 280/730.2, 748, 749, 751, 753; 49/64, 49/67, 74.1, 80.1, 86.1; 89/36.01, 36.03
See application file for complete search history.

(56) References Cited

U.S. PATENT DOCUMENTS

| 1,708,636 | A | * | 4/1929 | Shook | 160/150 |
| 1,723,095 | A | * | 8/1929 | Tate | 160/172 R |
| 2,349,470 | A | * | 5/1944 | Stanfield | 49/62 |
| 2,565,979 | A | * | 8/1951 | Michaelsen | 49/74.1 |
| 3,008,519 | A | * | 11/1961 | Hawkins | 160/169 |
| 3,685,205 | A | * | 8/1972 | Requena | 49/64 |
| 3,889,970 | A | * | 6/1975 | Astheimer et al. | 280/749 |
| 4,121,380 | A | * | 10/1978 | Lockshin | 49/67 |
| 4,505,070 | A | * | 3/1985 | Clipp et al. | 49/82.1 |
| 4,554,762 | A | * | 11/1985 | Anderson | 49/74.1 |
| 4,635,962 | A | * | 1/1987 | Miyada | 280/749 |
| 6,182,783 | B1 | | 2/2001 | Bayley | |
| 6,183,028 | B1 | * | 2/2001 | Ament et al. | 296/24.43 |
| 6,279,639 | B1 | * | 8/2001 | Schlecht et al. | 160/23.1 |

(Continued)

FOREIGN PATENT DOCUMENTS

| JP | 2002-370604 A | 12/2002 |
| JP | 2003-019938 A | 1/2003 |

(Continued)

*Primary Examiner* — Laura Freedman
(74) *Attorney, Agent, or Firm* — Global IP Counselors, LLP

(57) ABSTRACT

A vehicle body structure includes a side wall, a vehicle impact sensor, a window covering assembly and a control mechanism. The window covering assembly is coupled to the side wall and has a plurality of window covering members extending along a window opening in the side wall from a first side of the window opening to a second side of the window opening opposite the first side. Each of the plurality of window covering members is configured to pivot between a window exposing orientation and a window covering orientation. The control mechanism is connected to the vehicle impact sensor and operably coupled to the plurality of window covering members to rapidly move the plurality of window covering members to the window covering orientation in response to detection of a vehicle impact event by the vehicle impact sensor.

18 Claims, 11 Drawing Sheets

(56) References Cited

U.S. PATENT DOCUMENTS

| | | | |
|---|---|---|---|
| 6,478,373 B1 * | 11/2002 | Hake et al. | 297/216.13 |
| 6,834,705 B2 * | 12/2004 | Seel | 160/370.22 |
| 6,871,902 B2 * | 3/2005 | Carson et al. | 296/146.15 |
| 7,387,184 B2 | 6/2008 | Bethge et al. | |
| 7,740,276 B2 * | 6/2010 | Watson | 280/748 |
| 7,874,343 B2 * | 1/2011 | Hansen | 160/370.22 |
| 7,942,184 B2 * | 5/2011 | Cech et al. | 160/84.05 |
| 7,946,615 B2 * | 5/2011 | Takahashi et al. | 280/730.2 |
| 8,037,802 B2 * | 10/2011 | Ciriscioli et al. | 89/36.01 |
| 8,881,455 B2 * | 11/2014 | Ro et al. | 49/7 |
| 2004/0011478 A1 * | 1/2004 | Wilkins | 160/172 R |
| 2010/0043292 A1 | 2/2010 | Wilkins | |

FOREIGN PATENT DOCUMENTS

| | | |
|---|---|---|
| JP | 2003-081049 A | 3/2003 |
| JP | 2006-116986 A | 5/2006 |
| JP | 2007-091057 A | 4/2007 |
| WO | 02-06620 A1 | 1/2002 |

\* cited by examiner

VEHICLE BODY STRUCTURE

BACKGROUND

1. Field of the Invention

The present invention generally relates to a vehicle body structure that includes a window covering assembly. More specifically, the present invention relates to vehicle body structure that defines a window opening and a window covering assembly that completely covers window glass in the window opening in response to an impact event.

2. Background Information

The National Highway Traffic Safety Administration has published new rules related to impact events and vehicle ejection mitigation. Specifically, Federal Motor Vehicle Safety Standard (FMVSS) 226 Ejection Mitigation sets forth compliance criterion for countermeasures that must reduce occurrences of complete and/or partial ejections of vehicle occupants during impact events, including rollover events.

SUMMARY

One object of the disclosure is to provide a vehicle body structure with a window covering assembly that moves to a window covering orientation in response to detection of an impact event, thereby preventing ejection during the impact event.

In view of the state of the known technology, one aspect of the disclosure is a vehicle body structure that includes a side wall, a vehicle impact sensor, a window covering assembly and a control mechanism. The side wall has a window opening. The window covering assembly is coupled to the side wall and has a plurality of window covering members extending along the window opening from a first side of the window opening to a second side of the window opening opposite the first side. Each of the plurality of window covering members is configured to pivot between a window exposing orientation and a window covering orientation. The control mechanism is connected to the vehicle impact sensor and operably coupled to the plurality of window covering members to rapidly move the plurality of window covering members to the window covering orientation in response to detection of a vehicle impact event by the vehicle impact sensor.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following description of the embodiments are provided for illustration only and not for the purpose of limiting the invention as defined by the appended claims and their equivalents.

Figure 1:
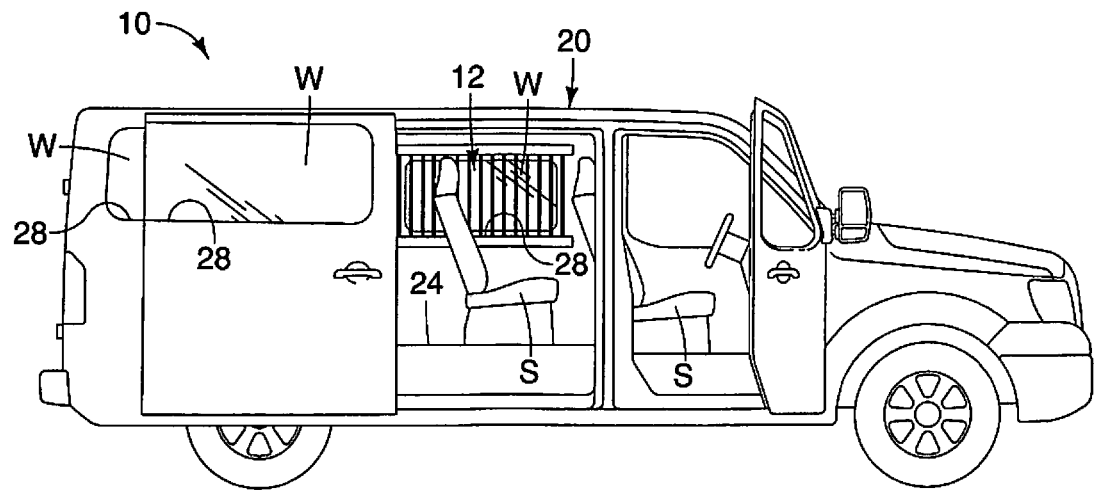
FIG. 1 is a side view of a vehicle showing a passenger compartment with seats adjacent to window openings and window covering assemblies in accordance with a first embodiment.
Figure 2:
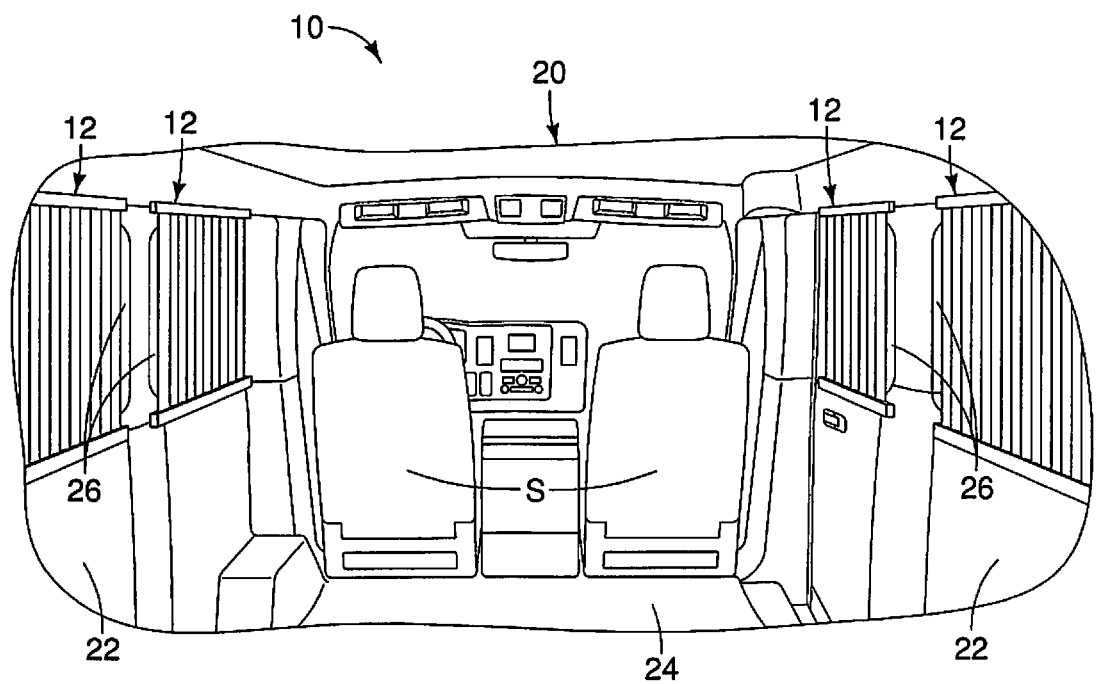
FIG. 2 is a perspective view of the passenger compartment of the vehicle depicted in FIG. 1, showing side wall structures having a plurality of the window openings, each window opening being covered by a corresponding one of the window covering assemblies in accordance with the first embodiment.

Referring initially to FIGS. 1 and 2, a vehicle 10 that includes a plurality of window covering assemblies 12, is illustrated in accordance with a first embodiment. The window covering assemblies 12 are described in greater detail following a description of related features of the vehicle 10.

The vehicle 10 is a passenger vehicle in the first embodiment, but can be a commercial vehicle that carries cargo and/or passengers. In the first embodiment, the vehicle 10 can be configured to carry passengers and/or cargo.

The vehicle 10 has a vehicle body structure 20 that includes, among other components, side wall structures 22 and a floor 24. A plurality of rear seats S can be installed to the floor 24 to carry passengers. The vehicle 10 may have additional rear seats S installed for a passenger carrying configuration, as shown in FIG. 1. Alternatively, as shown in FIG. 2, the rear seats S can be removed for a cargo carrying configuration. Each of the two side wall structures 22 includes sash sections 26 that surround respective window openings 28 with window glass W fitted thereto in a conventional manner. In the passenger carrying configuration, as shown in FIG. 1, each of the seats S can be located adjacent to a corresponding one of the window openings 28, one of the window sash sections 26 and one of the window glasses W. Since side wall structures, window sash structures, window openings and window glass are conventional features, further description is omitted for the sake of brevity.

In the vehicle 10, each of the plurality of window covering assemblies 12 is identical, except for their respective locations within the passenger compartment of the vehicle 10. However, since they are all identical, description of one of the window covering assemblies 12 applies to each of them. Therefore, for the sake of brevity, only one of the window covering assemblies 12 is described in detail.

Figure 3:
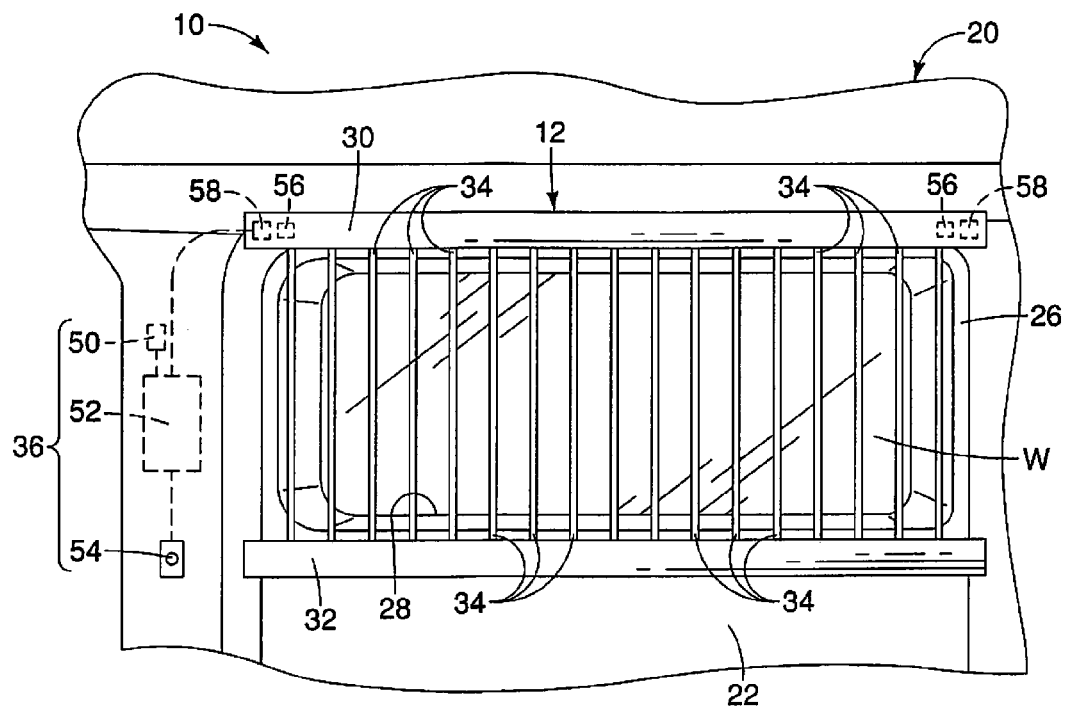
FIG. 3 is a side view of one of the side wall structures within the passenger compartment showing the window opening and the window covering assembly with window covering members of the window covering assembly in a window exposing orientation in accordance with the first embodiment.
Figure 4:
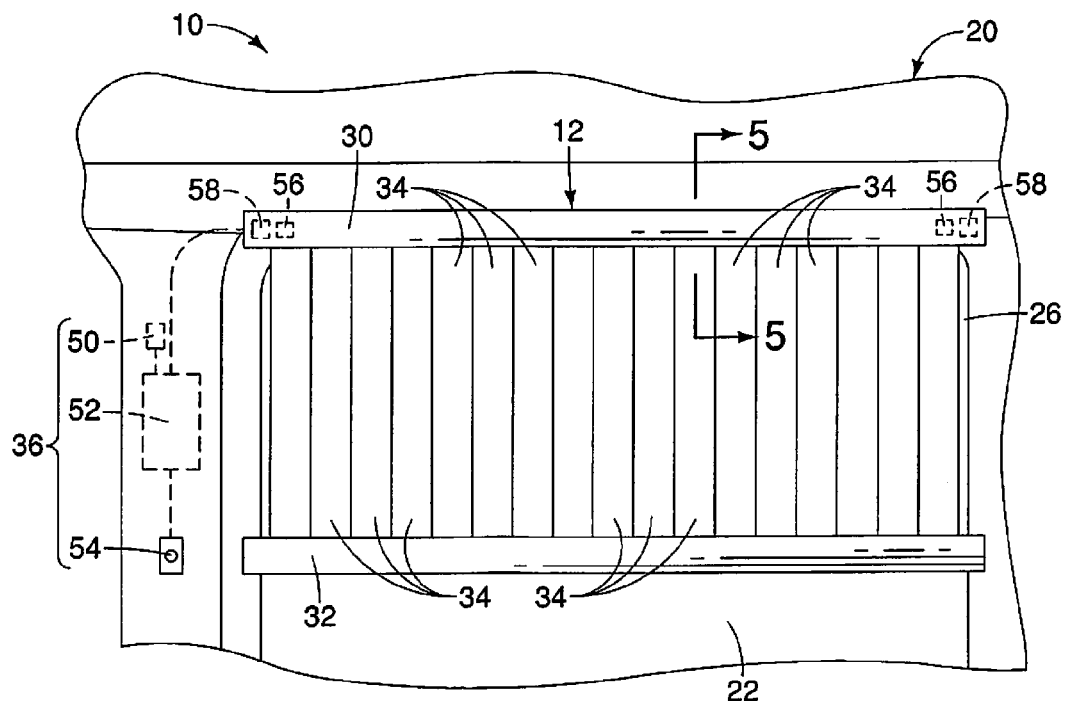
FIG. 4 is another side view of the side wall structure depicted in FIG. 3 showing the window covering members of the window covering assembly moved to a window covering orientation completely covering the window opening in accordance with the first embodiment.

As shown in FIGS. 3 and 4, the window covering assembly 12 is attached to the side wall structure 22 such that the window covering assembly 12 extends over a corresponding one of the sash sections 26 and the window opening 28. The window covering assembly 12 includes an upper support 30, a lower support 32, a plurality of window covering members 34 and a control mechanism 36.

Figure 5:
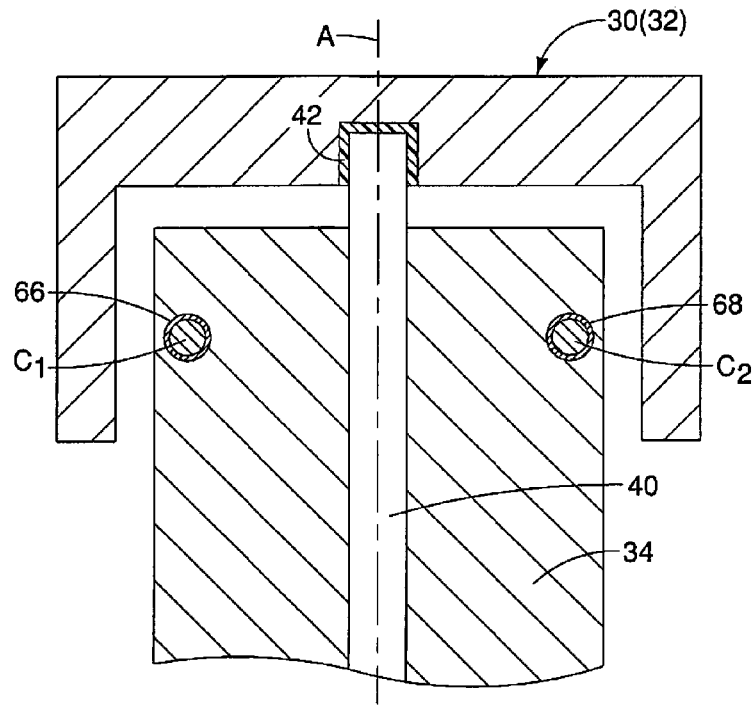
FIG. 5 is a cross-sectional view of a portion of the window covering assembly taken along the line 5-5 in FIG. 4, showing a pivot shaft of one of the window covering members supported by an upper support of the window covering assembly in accordance with the first embodiment.

The upper support 30 and the lower support 32 are rigidly fixed to the side wall structure 22 by, for example, welding techniques or mechanical fasteners (not shown). The upper support 30 is fixed to the side wall structure 22 above the window opening 28 and corresponding window glass W. Similarly, the lower support 32 is fixed to the side wall structure 22 below the window opening 28 and corresponding window glass W. As shown in FIG. 5, the upper support 30 (and similarly the lower support 32) supports the plurality of window covering members 34 for pivotal movement between a window exposing orientation shown in FIG. 3 and a window covering orientation shown in FIG. 4, as described in greater detail below.

The window covering members 34 extend from the upper support 30 to the lower support 32 along the window opening 28. Each of the plurality of window covering members 34 is basically a louver that has a long, thin elongated rectangular shape with a pivot shaft 40 extending therethrough. The pivot shaft 40 is centered within the window covering member 34 defining a pivot axis A, as shown in FIG. 5. An upper end of the pivot shaft 40 pivots within a corresponding bushing 42 within an opening of the upper support 30. Similarly, a lower end of the pivot shaft 40 pivots within an identical bushing 42 within an opening of the lower support 32. Since the upper and lower supports 30 and 32 support the window covering members 34 in basically the same manner, the depiction in FIG. 5 represents a cross-section of both the upper and lower supports 30 and 32.

As shown in FIGS. 3 and 4, each of the plurality of window covering members 34 is configured to pivot between the window exposing orientation (FIG. 3) and the window covering orientation (FIG. 4). The window covering members 34 are parallel to one another and their respective pivot axes A are similarly parallel to one another. The window covering members 34 and their respective pivot axes A are located at fixed spaced apart intervals relative to one another. In the embodiment depicted in FIGS. 3-7, the window covering members 34 extend vertically and are parallel to one another.

Figure 6:
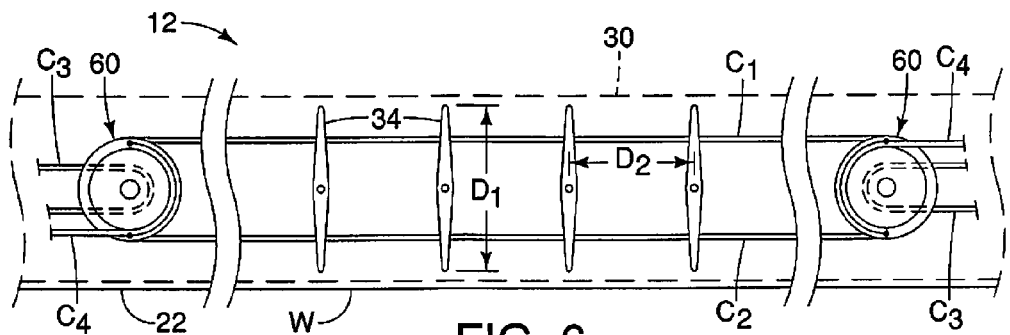
FIG. 6 is a top view of the window covering assembly with the upper support shown in phantom, showing portions of a control mechanism and several of the window covering members in the window exposing orientation in accordance with the first embodiment.
Figure 7:
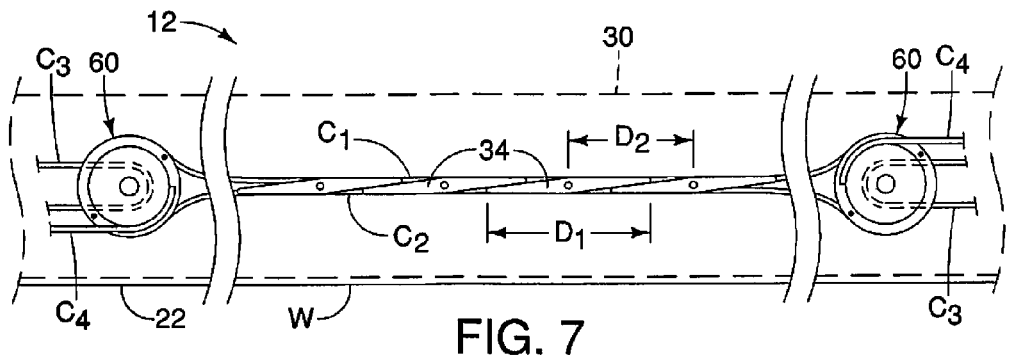
FIG. 7 is another top view of the window covering assembly similar to FIG. 6 the showing portions of the control mechanism and the window covering members in the window covering orientation in accordance with the first embodiment.

As shown in FIGS. 6 and 7, each of the window covering members 34 has a width $D_1$ (measured in a horizontal direction when in the window exposing orientation shown in FIG. 6), as shown in FIGS. 6 and 7. The window covering members 34 and their respective pivot axes A are spaced apart from one another by a distance $D_2$ with the window covering members 34. The width $D_1$ is greater than the distance $D_2$. Consequently, with the window covering members 34 in the window covering orientation (FIGS. 4 and 7) the edges of adjacent ones of the window covering members 34 overlap. Therefore, with the window covering members 34 in the window covering orientation (FIGS. 4 and 7), the window covering members 34 completely cover the window opening 28 and corresponding window glass W.

The window covering members 34 are configured to pivot between the window exposing orientation and the window covering orientation in unison with one another. Movement of the window covering members 34 is controlled by the control mechanism 36, as described further below.

As shown in FIGS. 3-11, the control mechanism 36 includes a vehicle impact sensor 50 (FIGS. 3 and 4 only), a controller 52 (FIGS. 3 and 4 only), a user control unit 54 (FIGS. 3 and 4 only), motors 56 (FIGS. 3, 4 and 8-11), one-way movement mechanisms 58 (FIGS. 3, 4 and 8-11), a pulley assembly 60 (FIGS. 6-11 only) and cables $C_1$, $C_2$, $C_3$ and $C_4$ (FIGS. 5-11 only).

In the first embodiment, the control mechanism 36 includes two motors 56, two one-way movement mechanisms 58 and two pulley assemblies 60, all concealed within the upper support 30. The motors 56 are identical to one another. The one-way movement mechanisms 58 are identical to one another, and the pulley assemblies 60 are identical to one another. Hence, in the description below, only one of the motors 56, one of the one-way movement mechanisms 58 and one of the pulley assemblies 60 is described below for the sake of brevity.

Further, although not shown, the lower support 32 can alternatively be provided with two motors 56, two one-way movement mechanisms 58 and two pulley assemblies 60 in addition to those within the upper support 30 or as an alternative to those within the upper support 30 as needed or desired. Still further, although not shown, the motors 56, the one-way movement mechanisms 58 and the two pulley assemblies 60 can alternatively be entirely or partially installed and concealed within the side wall structures 22 instead of being entirely within the upper support 30 and/or the lower support 32.

It should also be understood from the drawings and the description herein that the control mechanism 36 can be provided with only a single motor 56, a single one-way movement mechanism 58 and a single pulley assembly 60, depending upon the overall design and configuration of the window covering assembly 12.

The vehicle impact sensor 50 is, for example, a motion detection sensor that detects rapid changes in acceleration greater than those normally experienced by the vehicle 10. The vehicle impact sensor 50 can, for example, be an airbag sensor that also triggers deployment of airbags (not shown). The controller 52 is in direct electronic communication with the vehicle impact sensor 50, the user control unit 54, the motors 56 and the one-way movement mechanisms 58 by, for example, electronic wires or wireless communication devices. The controller 52 operates in a manner described further below.

The user control unit 54 is an optional feature that can be provided for the convenience of vehicle passengers. The user control unit 54 is a manually operated device configured such that a passenger within the vehicle 10 can input a desired setting into the user control unit 54 in order to move the plurality of window covering members 34 to any position between the window exposing orientation and the window covering orientation. For example, the user control unit 54 can include a rotary control dial (not shown) or switch (not shown) that is moveable to positions corresponding to the positions of the plurality of window covering members 34. If a user wishes to cover the window opening 28 in order to block out light or have privacy, the user control unit 54 can be operated to a position causing the window covering members 34 to move to the window covering orientation (FIG. 4). If the user wishes to see out the window, the user control unit 54 can be operated to move the window covering members 34 to the window exposing orientation. The setting of the user control unit 54 is detected by the controller 52, and the controller 52 operates the motors 56 to move the window covering members 34 to the selected position. It should be understood that the user control unit 54 can be a digital device, an analog device or a simple switch with open and closed settings. Further, the user control unit 54 can be located adjacent to the window opening 28 or can be remotely positioned.

Figure 9:
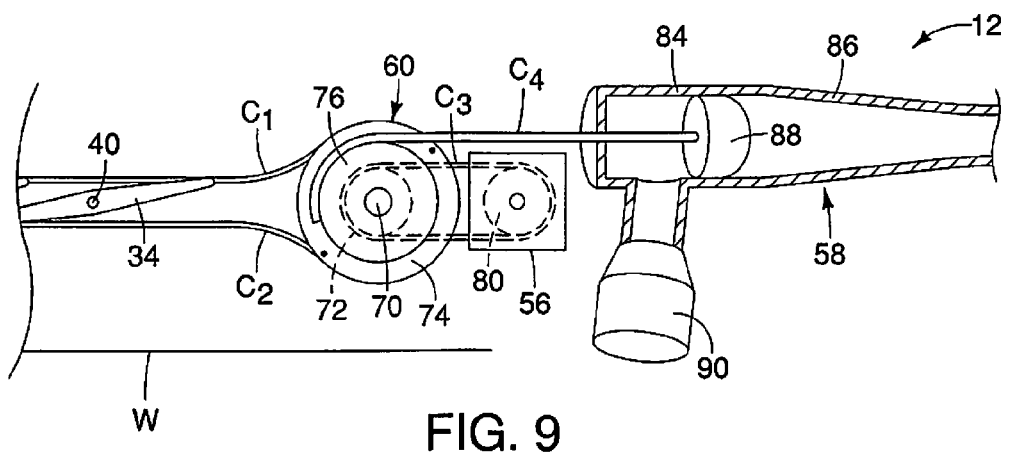
FIG. 9 is another top view of the window covering assembly similar to FIG. 8 showing the window covering members moved toward the window covering orientation via operation of the motor in accordance with the first embodiment.
Figure 10:
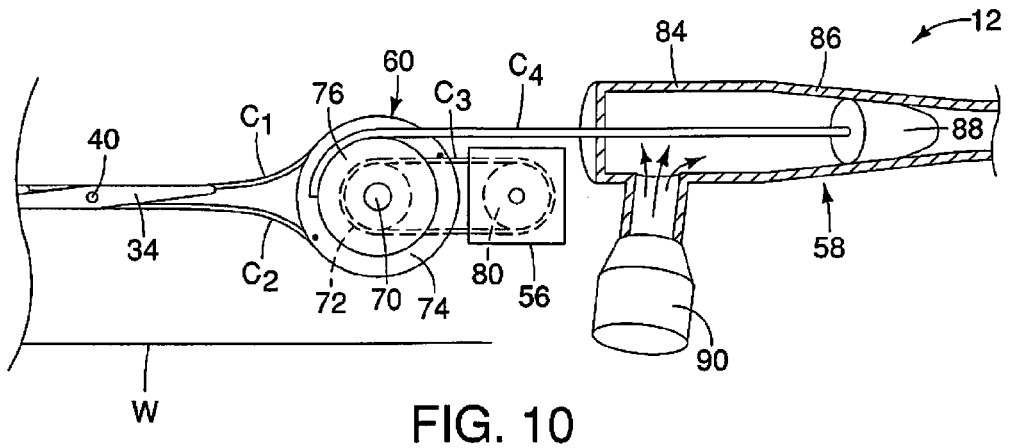
FIG. 10 is another top view of the window covering assembly similar to FIGS. 8 and 9 showing the window covering members moved to the window covering orientation via deployment of the one-way movement mechanism in accordance with the first embodiment.
Figure 11:
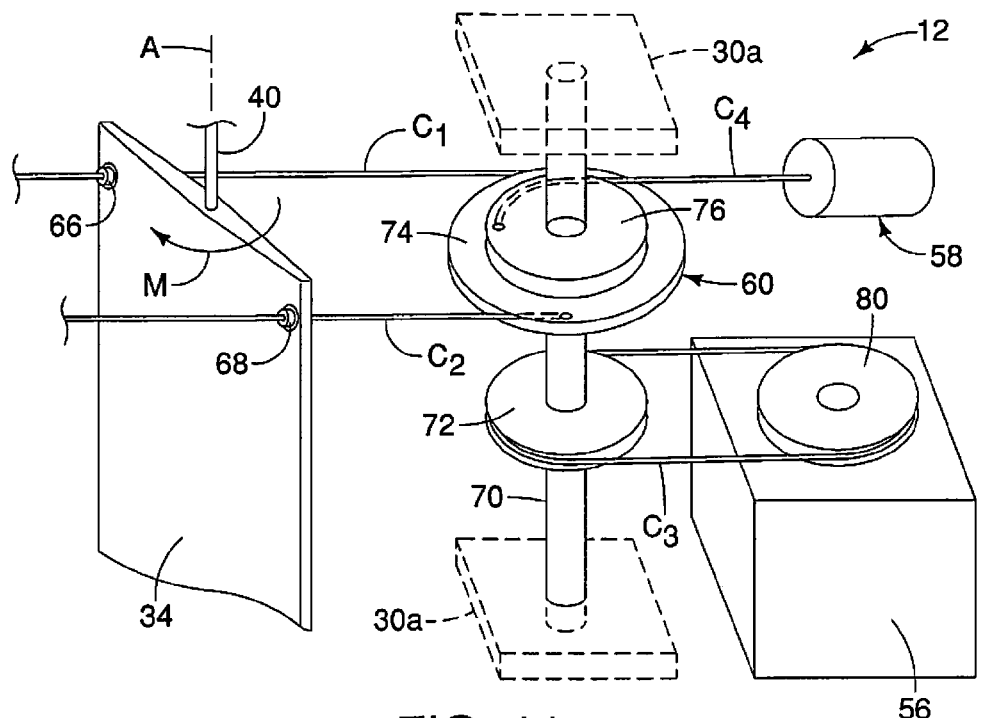
FIG. 11 is a perspective view of a portion of the window covering assembly showing one of the window covering members in the window exposing orientation and the pulley assembly coupled to the motor and the one-way movement mechanism in accordance with the first embodiment.

As shown in FIGS. 5-11, the window covering members 34 are connected to one another via the cables $C_1$ and $C_2$. Specifically, each of the window covering members 34 has apertures with sleeves 66 and 68 near upper corners thereof, as shown in FIGS. 5 and 11. The cables $C_1$ and $C_2$ extend through respective ones of the sleeves 66 and 68. The cables $C_1$ and $C_2$ are fixedly attached to opposite sides of the window covering members 34 by the respective sleeves 66 and 68 via, for example, crimping of the sleeves 66 and 68 against surfaces of the cables $C_1$ and $C_2$. The sleeves 66 and 68 are fixedly attached to attach the cables $C_1$ and $C_2$ and to the window covering members 34. Consequently, movement of the cables $C_1$ and $C_2$ causes corresponding movement of the window covering members 34. It should be understood from the drawings and the description herein that the sleeves 66 and 68 can be replaced with any of a variety of mechanical fastening structures, such as threaded fasteners, rivets, clamps or crimped portions of the window covering members 34 (not shown). In other words, the mechanical fastening structures can be any of a variety of structures that slave movement of the window covering members 34 to movement of the cables $C_1$ and $C_2$.

As shown in FIG. 11, the pulley assembly 60 includes a shaft 70, a first pulley 72, a second pulley 74 and a third pulley 76. The first second and third pulleys 72, 74 and 76 are all fixedly attached to the shaft 70 for rotation therewith. The shaft 70 is rotatably supported by support blocks 30a fixed within the upper support 30.

As shown in FIGS. 8-11, the motor 56 include a gear or pulley 80 that is fixed to a shaft of the motor 56. The motor 56 is preferably a stepper motor that can be incrementally rotated a predetermined arcuate distance, but is not required to continuously rotate. Rather, the motor 56 rotates a specific number of degrees of a circle in response to a pulse or pulses from the controller 52 such that the arcuate position of the pulley 80 can be accurately set. The cable $C_3$ is wrapped around the pulley 80 and the pulley 72, mechanically connecting the motor 56 and the pulley assembly 60. The cable $C_3$ can be a belt with gear teeth or can be a chain in order to prevent any slippage between movement of the cable $C_3$ and the pulleys 80 and 72. Alternatively, the cable $C_3$ can be fixedly attached to both the pulleys 72 and 80 in order to prevent slippage and ensure accurate positioning of the window covering members 34 via operation of the motor 56.

Respective ends of the cables $C_1$ and $C_2$ are fixedly attached to the pulley 74 of the pulley assembly 60. Thus operation of the motor 56 causes rotation of the pulley 80 and the pulley 72. Rotation of the pulley 72 being fixed to the shaft 70 causes rotation of the pulley 74 which in turn causes movement of the cables $C_1$ and $C_2$ and movement of the window covering members 34.

A first end of the cable $C_4$ is connected to the pulley 76 and a second end of the cable $C_4$ is connected to the one-way movement mechanism 58. The one-way movement mechanism 58 is a tensioning device that is triggered by the controller 52 to rapidly move the cable $C_4$ in order to rapidly move the window covering members 34 from the window exposing orientation to the window covering orientation in response to detection of an impact event by the vehicle impact sensor 50.

The one-way movement mechanism 58 is basically a pyrotechnic tensioning device. The one-way movement mechanism 58 can have any of a variety of configurations. However, in the depicted embodiment, the one-way movement mechanism 58 includes a cylindrically shaped housing 84 with a tapering section 86, a piston 88 within the housing and a pyrotechnic canister 90. The pyrotechnic canister 90 is attached to the housing 84 such that upon deployment, the pyrotechnic canister 90 generates a rapid high pressure environment within the housing 84 causing the piston 88 to move, applying tension on the cable $C_4$ and moving the pulley 76. Deployment further causes the window covering members 34 to move from the window exposing orientation to the window covering orientation, covering the window opening 28. Deployment also causes the piston 88 to become lodged or jammed in the tapering section 86 of the housing 84, thereby preventing the window covering members 34 from moving out of the window covering orientation.

The pyrotechnic canister 90 is directly connected to the controller 52 such that the controller 52 can trigger ignition of the pyrotechnic canister 90 in response to detection of an impact event by the vehicle impact sensor 50.

Figure 8:
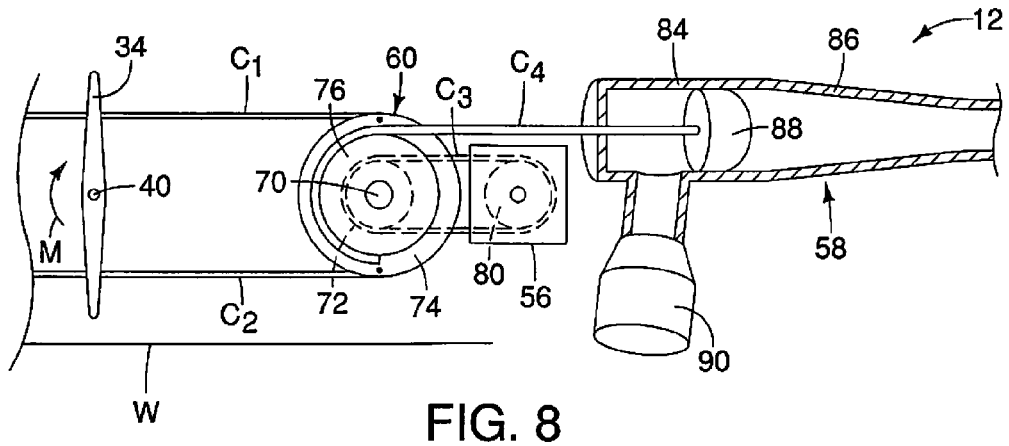
FIG. 8 is another top view of the window covering assembly showing the window covering members in the window exposing orientation and portions of the control mechanism including a pulley assembly, a motor and a one-way movement mechanism in accordance with the first embodiment.

As shown in FIGS. 8 and 9, during normal operation of the window covering assembly 12, the cable $C_4$ has no effect on positioning of the window covering members 34. The window covering members 34 can be moved between the window exposing orientation and the window covering orientation by operation of the user control unit 54. The passenger manipulates the user control unit 54 to re-position the window covering members 34. In response, the controller 52 operates the motor 56 to rotate causing the pulley 72 to rotate, which in turn rotates the pulley 74 moving the cables $C_1$ and $C_2$. Movement of the cables $C_1$ and $C_2$ causes the window covering members 34 to rotate in the direction M (FIG. 8) from the window exposing orientation to the window covering orientation, or the selected position therebetween. During this re-positioning of the window covering members 34, the cable $C_4$ becomes slack (not shown). When the controller 52 operates the motor 56 to rotate in order to move the window covering members 34 back to the window exposing orientation, the pulley 72 rotates, which in turn rotates the pulley 74 moving the cables $C_1$ and $C_2$. Movement of the cables $C_1$ and $C_2$ causes the window covering members 34 to rotate in a direction opposite the direction M, causing the window covering members 34 to move back to the window exposing orientation. For example, FIG. 8 shows the window covering members 34 in the window exposing orientation and FIG. 9 shows the window covering members 34 being moved toward the window covering orientation via operation of the motor 56. When the window covering members 34 return to the window exposing orientation, the cable $C_4$ is moved such that the slack (not shown) is eliminated and the cable $C_4$ can be under little or no tension. Hence, the motor 56 can independently move the window covering members 34 with no effect on the one-way movement mechanism 58.

In response to detection of an impact event by the vehicle impact sensor 50 and the controller 52, the controller deploys or ignites the pyrotechnic canister 90, causing the one-way movement mechanism 58 to deploy. The pressure within the housing 84 causes the piston 88 to move to the tapering section 86, pulling on the cable $C_4$, and rapidly moving the window covering members 34 to the window covering orientation. The piston 88 becomes wedged within the tapering section 86 as shown in FIG. 10, or can move to a point beyond the tapering section 86, locking the window covering members 34 in the window covering orientation.

Second Embodiment

Figure 12:
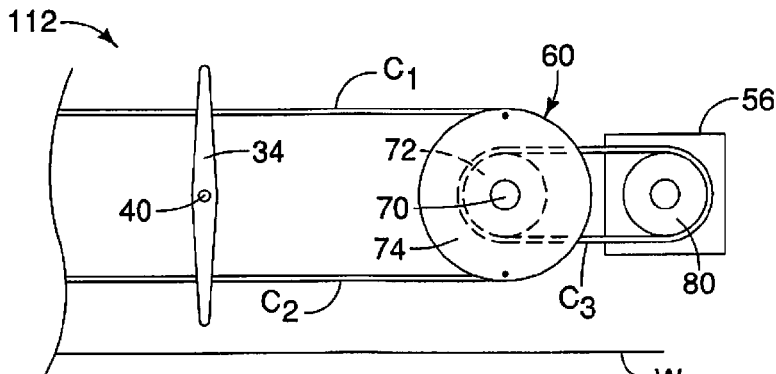
FIG. 12 is a top view of a window covering assembly showing one of a plurality of window covering members in a window exposing orientation and portions of a control mechanism including a pulley assembly and a motor in accordance with a second embodiment.
Figure 13:
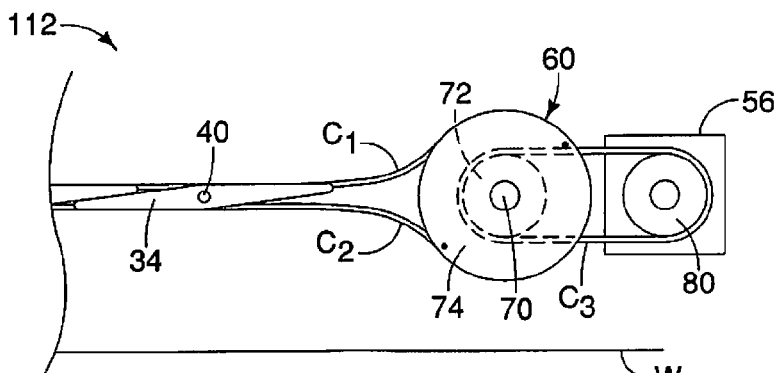
FIG. 13 is another top view of the window covering assembly depicted in FIG. 12 showing the window covering members, the pulley assembly and the motor in a window covering orientation in accordance with the second embodiment.

Referring now to FIGS. 12 and 13, a window covering assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the window covering assembly 112 includes all of the features of the window covering assembly 12 of the first embodiment, such as the window covering members 34, the cables $C_1$, $C_2$ and $C_3$, the motor 56 and the controller 52. However, in the second embodiment, the window covering assembly 112 does not include the one-way movement mechanism 58, cable $C_4$, or the pulley assembly 60. The pulley assembly 60 is replaced with a pulley assembly 160 that only includes the first pulley 72 and the second pulley 74. In the second embodiment, the window covering members 34 of the window covering assembly 112 are moved and positioned only in response to operation of the motor 56 by the controller 52. In other words, in response to detection of an impact event, the controller 52 operates the motor 56 to rapidly move the plurality of window covering members 34 to the window covering orientation, thereby covering the window opening 28.

Third Embodiment

Figure 14:
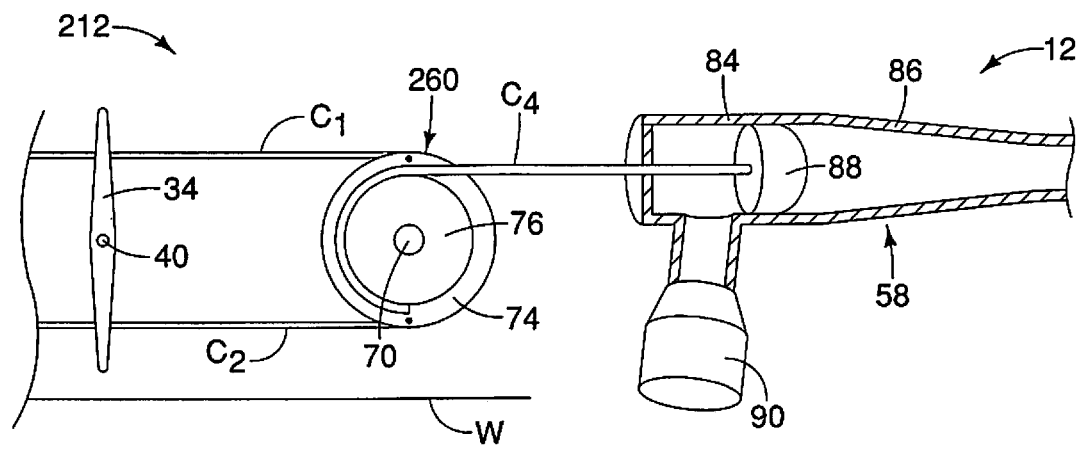
FIG. 14 is a top view of a window covering assembly showing one of a plurality of window covering members in a window exposing orientation and portions of a control mechanism including a pulley assembly and a one-way movement mechanism in accordance with a third embodiment.
Figure 15:
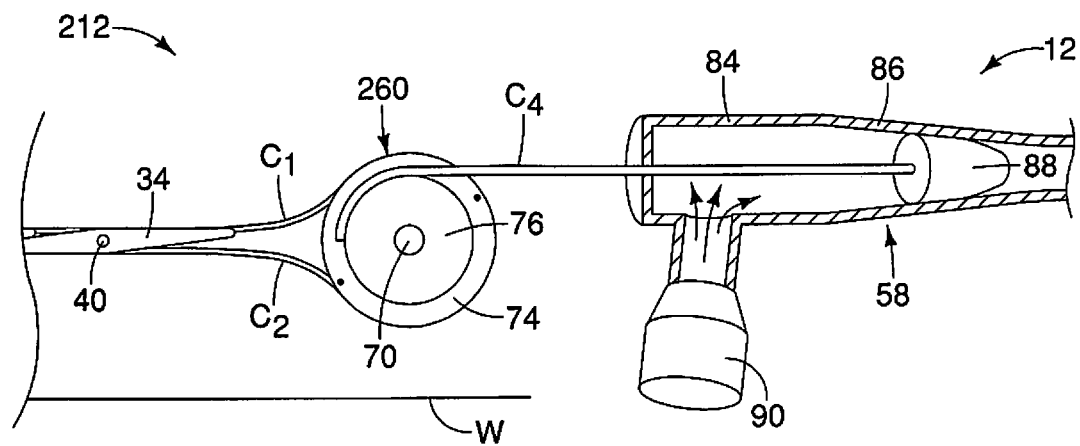
FIG. 15 is another top view of the window covering assembly depicted in FIG. 14 showing the window covering members, the pulley assembly and the one-way movement mechanism in a window covering orientation in accordance with the third embodiment.

Referring now to FIGS. 14 and 15, a window covering assembly 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the window covering assembly 212 includes all of the features of the window covering assembly 12 of the first embodiment, such as the window covering members 34, the cables $C_1$, $C_2$ and $C_4$, the one-way movement mechanism 58 and the controller 52. However, in the third embodiment, the window covering assembly 212 does not include the motor 56, cable $C_3$, or the pulley assembly 60. In the third embodiment, the window covering assembly 212 includes a pulley assembly 260 that includes the second pulley 74 and the third pulley 76. In the third embodiment, the window covering members 34 of the window covering assembly 212 are moved and positioned only in response to operation of the one-way movement mechanism 58 by the controller 52. In other words, in response to detection of an impact event, the controller 52 operates the one-way movement mechanism 58 to rapidly move the plurality of window covering members 34 to the window covering orientation, thereby covering the window opening 28.

Fourth Embodiment

Referring now to FIGS. 16-24, a window covering assembly 312 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment the window covering assembly 312 includes a first support 330, a second support 332, a plurality of window covering members 334 and a control mechanism 336. The first support 330 is fixedly attached to the side wall structure 22 at a first lateral side of the window opening 28 by welding techniques or mechanical fasteners (not shown). Similarly, the second support 332 is fixedly attached to the side wall structure 22 at a second lateral side of the window opening 28 by welding techniques or mechanical fasteners (not shown).

Figure 16:
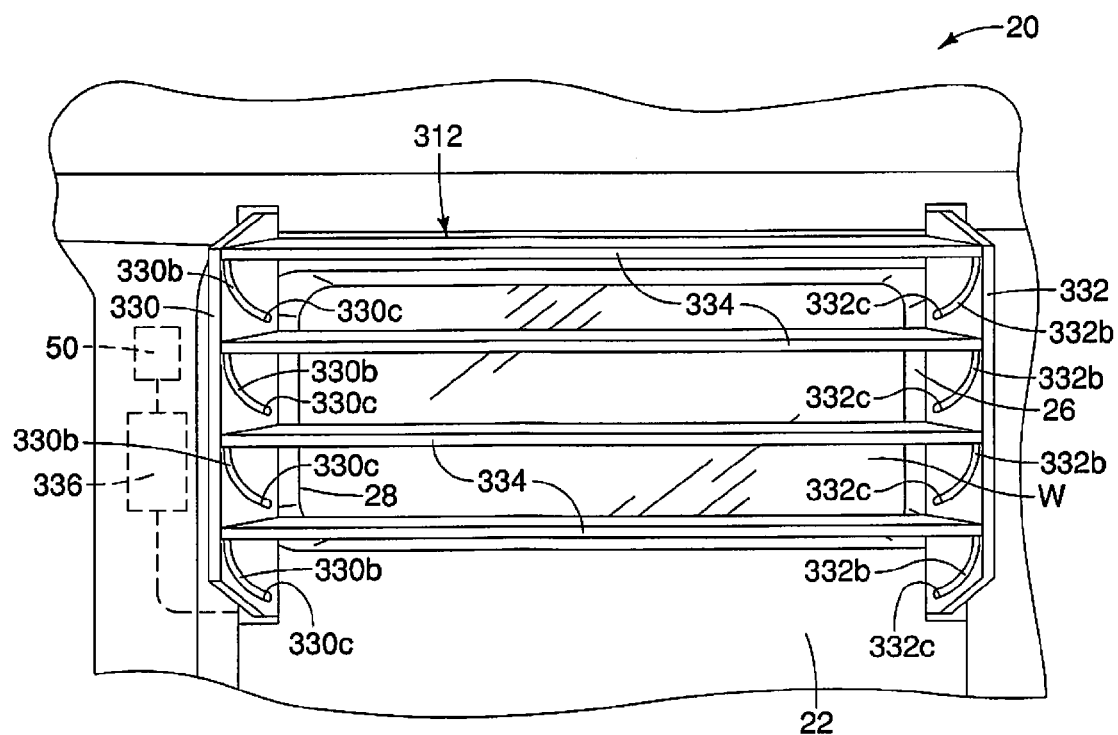
FIG. 16 is a side view of a side wall structures within a passenger compartment showing a window opening and a window covering assembly having a first support, a second support and window covering members between the first and second supports in a window exposing orientation in accordance with a fourth embodiment.
Figure 17:
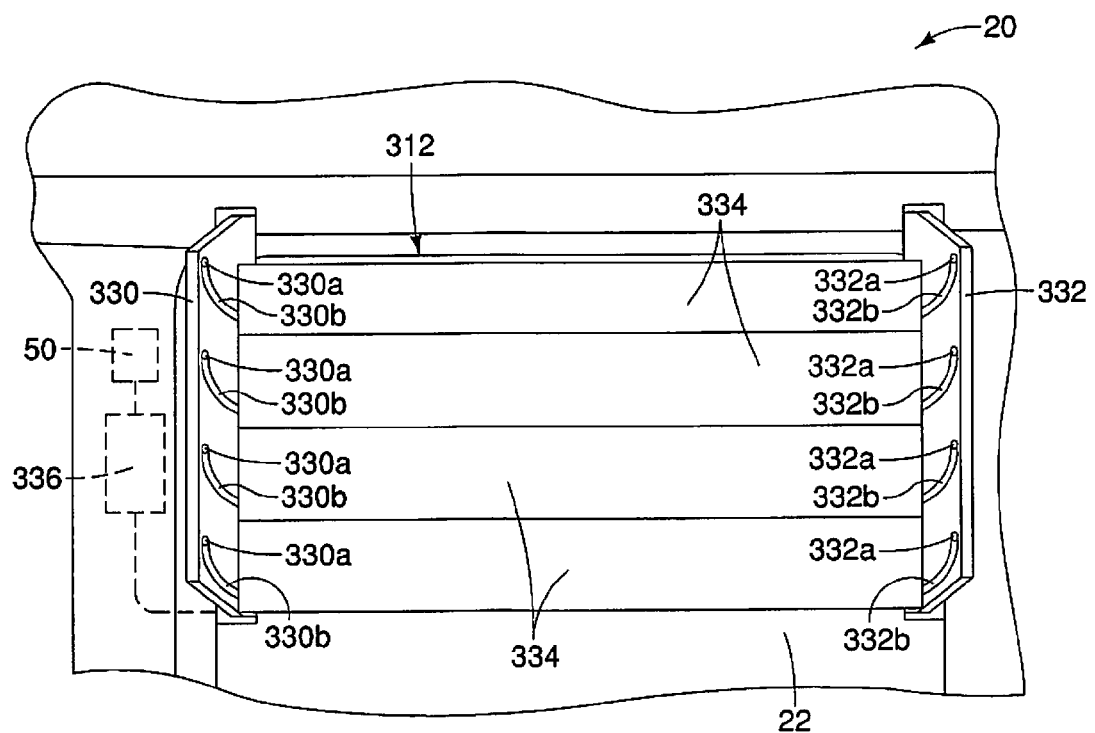
FIG. 17 is another side view of the side wall structure depicted in FIG. 16 showing the window covering members of the window covering assembly moved to a window covering orientation completely covering the window opening in accordance with the fourth embodiment.
Figure 18:
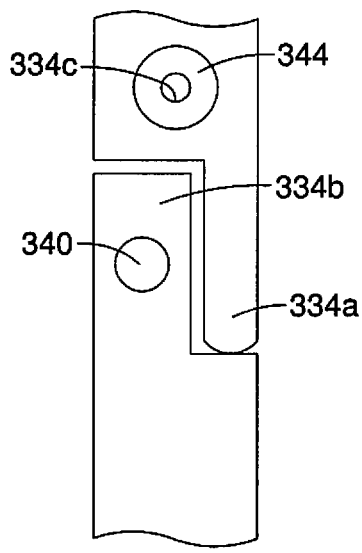
FIG. 18 is an end view of the window covering assembly showing the window covering members in the window covering orientation with an end of an upper one of the window covering members overlapping an end of a lower one of the window covering members in accordance with the fourth embodiment.

The window covering members 334 are attached to the first support 330 and second support 332 for pivotal movement between a window exposing orientation (FIG. 16) and a window covering orientation (FIG. 17). The window covering members 334 extend horizontally between the first and second supports 330 and 332. More specifically, in the fourth embodiment, the window covering members 334 are shelves. As shown in FIG. 18, each of the window covering members 334 includes a first edge 334a and a second edge 334b. In the window exposing orientation (FIG. 16), the first edge 334a is spaced apart from the window glass W in the window opening 28. However, in the window covering orientation (FIGS. 17 and 18), the first edge 334a moves to a point adjacent to the window glass W in the window opening 28. Further, the first edge 334a, includes a notch and the second edge 334b includes a mating notch such that in the window covering orientation the first edge 334a of one window covering member 334 overlaps with a portion of the second edge 334b of a lower and adjacent window covering member 334, as shown in FIG. 18. The window covering members 334 are dimensioned such that when the first edge 334a and the second edge 334b engage and mate with one another, there is a predetermined amount of friction contact therebetween. During an impact event, the window covering members 334 move quickly from the window exposing orientation to the window covering orientation. With the first edge 334a of one window covering member 334 contact the second edge 334b of the adjacent window covering member 334, the first edge 334a and the second edge 334b experience a friction fit engagement which serves to retain the window covering members 334 in the window covering orientation.

Each of the window covering members 334 also includes a pivot shaft 340 that is supported at opposite ends by the first and second supports 330 and 332. The pivot shafts 340 are located along the second edge 334b of the window covering members 334 and define pivot axes such that each of the pivot axes are located along the second edge 334b of the corresponding ones of the plurality of window covering members 334.

Figure 19:
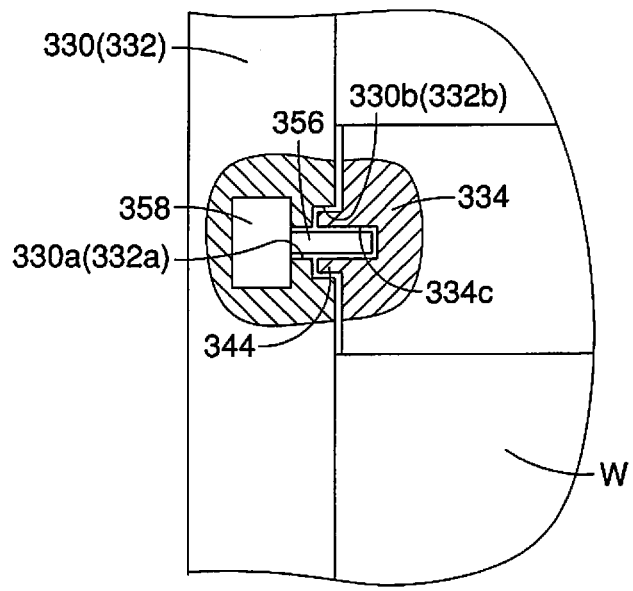
FIG. 19 is another side view of the window covering assembly with the window covering members in the window exposing orientation showing a guide pin of one of the window covering members extending into an arcuate recess formed in the first support, with one of a plurality of solenoid controlled pins that retains the window covering members in the window exposing orientation in accordance with the fourth embodiment.

As shown in FIGS. 16 and 17, the first support 330 includes a plurality of arcuate recesses 330b and the second support 332 includes a plurality of arcuate recesses 332b. The arcuate recesses 330b and 332b are paired with one another and define tracks for guiding movement of the window covering members 334 as they move from the a window exposing orientation (FIG. 15) to the window covering orientation (FIG. 16). Edges of the window covering members 334 include guide pins 344 that extend into respective ones of the arcuate recesses 330b and 332b, as shown in FIGS. 19 and 20.

The control mechanism 336 includes a plurality of solenoids 358 that are disposed within the first and second supports 330 and 332. The plurality of solenoids 358 include retractable pins 356 that are movable from a retaining position (FIGS. 16 and 19) to a retracted position (FIG. 17). In the retaining position (FIGS. 16 and 19), the retractable pins 356 extend out of apertures 330a and 332a (shown in FIG. 17) in the first and second supports 330 and 332, and retain respective ones of the window covering members 334 in the window exposing orientation (FIG. 16). In the retracted position, the retractable pins 356 are retracted into the first and second supports 330 and 332, thereby being moved away from the window covering members 334 such that the window covering members 334 are free to move to the window covering orientation (FIG. 17).

The control mechanism 336 is configured to operate the solenoids 358 to move the retractable pins 356 from the retaining position to the releasing position in response to the detection of the vehicle impact event by the vehicle impact sensor 50. As shown in FIGS. 18, 19 and 20, lateral edges of the window covering members 334 include the guide pins 344, each pin 344 having an aperture 334c. As shown in FIG. 19, in the retaining position, the retractable pins 356 extend into apertures 334c formed in the guide pins 344. The apertures 330a and 332a are formed at respective upper ends of the arcuate recesses 330b and 332b corresponding to the window exposing orientation, and the apertures 334c are formed in the guide pins 344 of the window covering member 334. As shown in FIG. 19, the apertures 334c align with respective apertures 330a and 332a so that the retractable pins 356 retain the pins 344 at the upper end of the arcuate recesses 330b and 332b. In the releasing position, the retractable pins 356 are retracted into apertures 330a and 332a within the first and second supports 330 and 332, as shown in FIG. 17, thereby releasing the window covering members 334 to pivot and move in accordance with the guide pins 344 within the arcuate recesses 330b and 332b.

Figure 20:
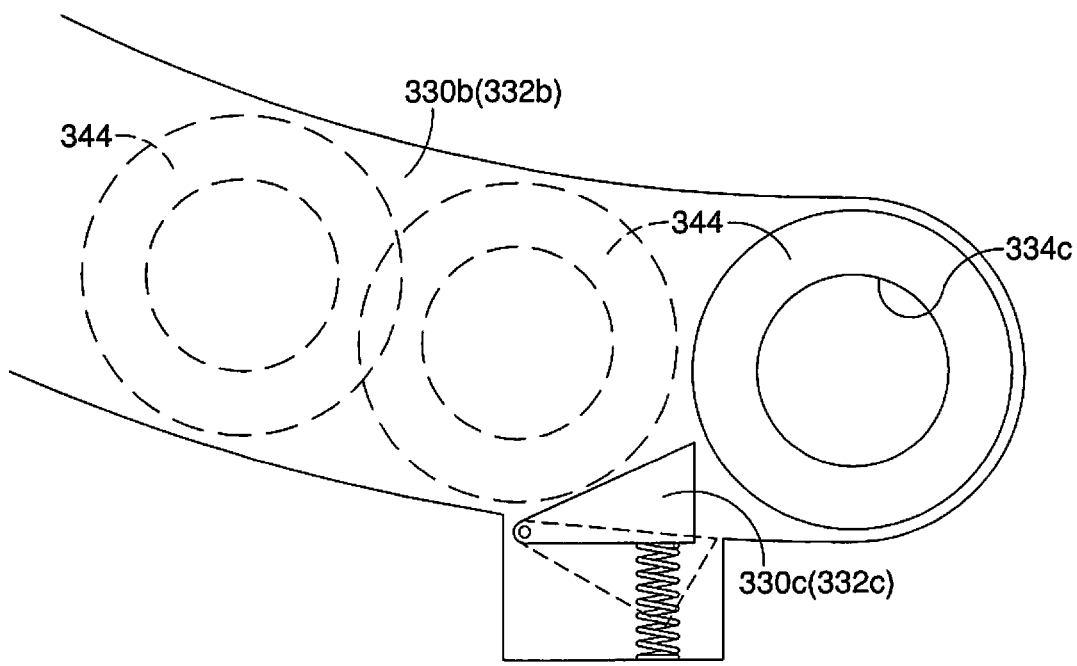
FIG. 20 is a side view of the first support of the window covering assembly, showing the guide pin extending into a lower section of the arcuate recess with the guide pin and the corresponding window covering member moving to and being retained in the window covering orientation by a locking mechanism in accordance with the fourth embodiment.

As shown in FIGS. 16 and 20, the first support 330 includes a locking structure 330c positioned in each of the arcuate recesses 330b, and the second support includes a locking structure 332c in each of the arcuate recesses 332b. The locking structures 330c and 332c may be located proximate lower ends of the arcuate recesses 330b and 332b opposite the upper ends for retaining the window covering members in the window covering orientation. Each of the locking structures 330c and 332c has a respective cam member 330d and 332d each having a corresponding ramp surface over which the guide pins 344 may pass as the guide pins 344 move from the respective upper ends of the arcuate recesses 330b and 332b toward respective lower ends of the arcuate recesses 330b and 332b. More specifically, the cam members 330d and 332d of the locking structures 330c and 332c includes the ramp surface which face toward the upper ends of the arcuate recesses 330b and 332c to facilitate movement of the guide pins 344 to the lower ends of the arcuate recesses 330b and 332c. The cam members 330d and 332d also include respective retaining surfaces facing toward the lower ends of the arcuate recesses 330b and 332b preventing movement of the pins 344 away from the lower ends of the arcuate recesses 330b and 332b. Alternatively, the ramp surfaces and retaining surfaces can be formed on movable detents that are pushed into respective apertures of the first support 330 and the second support 332 as the guide pins 344 of the window covering members 334 move from the upper ends of the arcuate recesses 330b and 332b to the lower ends. The movable detent can be biased to extend back through apertures to retain the guide pins 344 at the lower ends of the arcuate recesses 330b and 332b. With the guide pins 344 of the window covering members 334 positioned at the lower end of the arcuate recesses 330 and 332, the retaining surface of the locking structure locks the window covering members 334 in the window covering orientation.

FIGS. 21-24 show a modification to the fourth embodiment. Specifically, in the modification to the fourth embodiment, each of the window covering members 334 can include an optional net N. The nets N are movable from a stowed orientation (FIG. 21), to a cargo catching orientations shown in FIGS. 22 and 23, and finally to the window covering orientation shown in FIG. 24. Each of the nets N are fixed to the window covering members 334 by a pivot pin for pivotal movement relative to the first edge 334a of the corresponding one of the window covering members 334.

Figures 21, 22:
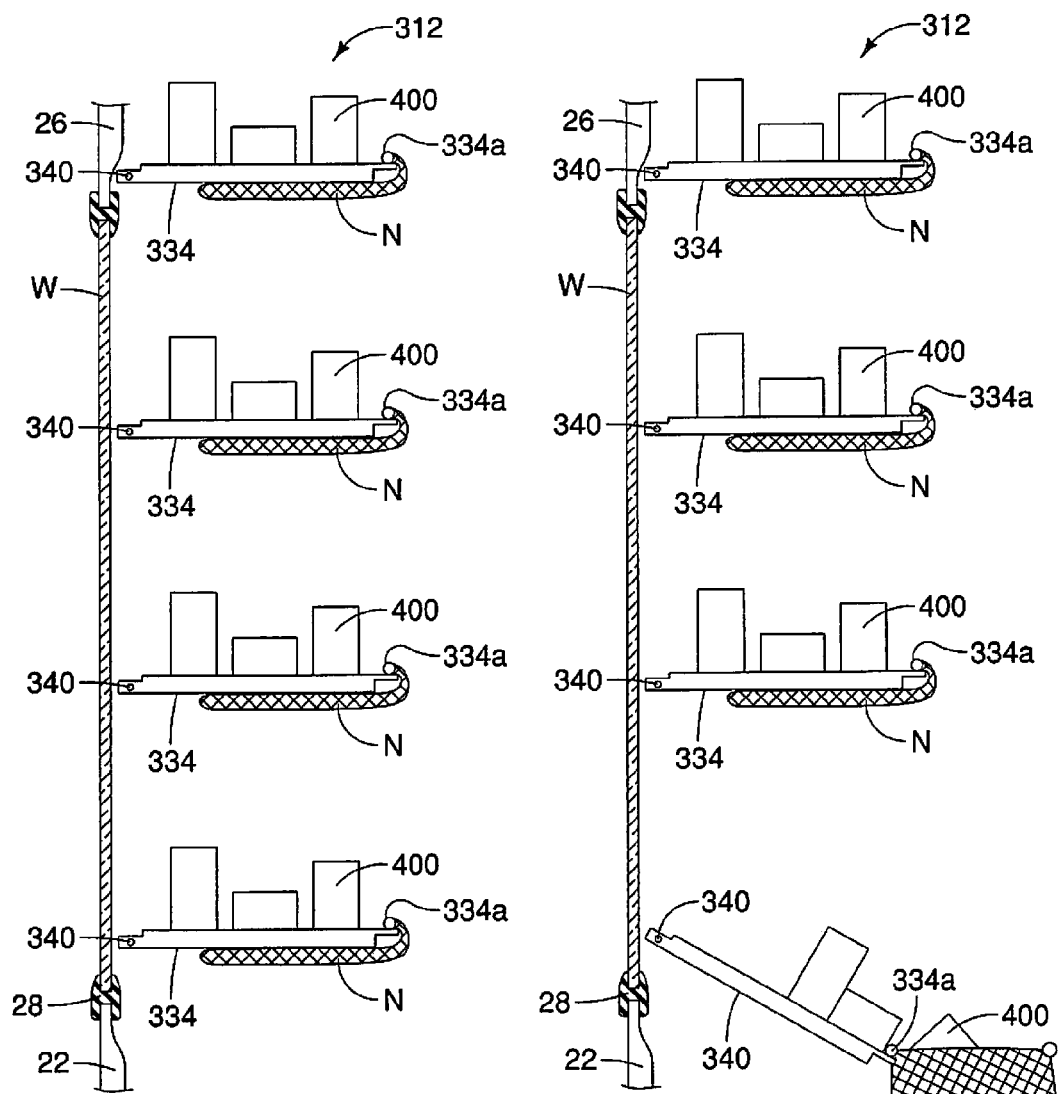
FIG. 21 is a side view of a window covering assembly similar to the window covering assembly depicted in FIGS. 16-19, showing window covering members in a window exposing orientation, the window covering members being connected to one another by cables and having cargo placed thereon, each of the window covering members having a net stowed along an underside thereof such that in response to the window covering members moving to the window covering orientation, the nets deploy and capture the cargo in accordance with a modification to the fourth embodiment.
FIG. 22 is another side view of the window covering assembly depicted in FIG. 21, showing the window covering members in an initial stage of moving from the window exposing orientation to the window covering orientation with one of the nets moving from the stowed position to the deployed position in response to an impact event in accordance with the modification to the fourth embodiment.
Figure 23:
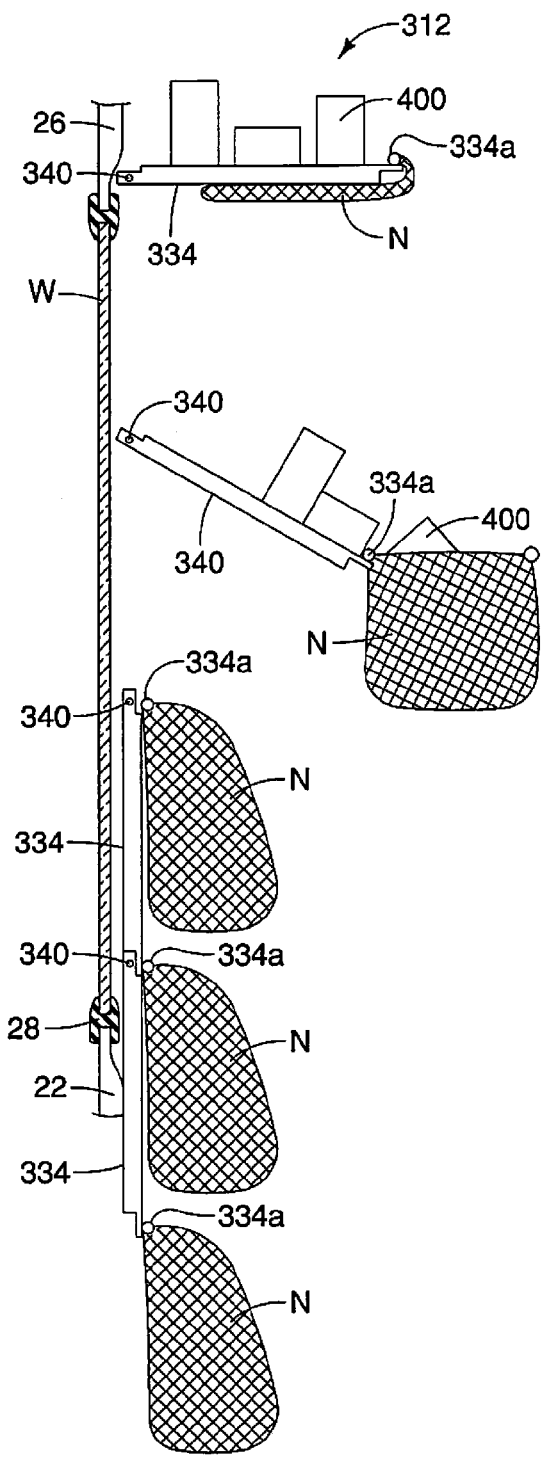
FIG. 23 is another side view of the window covering assembly depicted in FIGS. 21 and 22, showing the window covering members in an intermediate stage of moving from the window exposing orientation to the window covering orientation with a second one of the nets moving from the stowed position to the deployed position in response to the impact event in accordance with the modification to the fourth embodiment.

In the stowed orientation (FIG. 21) the optional nets N are located along an underside of each of the window covering members 334. Upon deployment (in response to a detected impact event), the nets N pivot outward to cargo catching orientations (FIGS. 22-23). Initially in the cargo catching orientation, the nets N pivot outward such that upper ends of the nets N open in order to capture cargo 400 stored on the window covering members 334, as shown in the deployment sequence depicted in FIGS. 22, 23 and 24. Specifically, the solenoids 358 and retractable pins 356 are operated sequentially such that the lowest window covering members 334 is released first, as shown in FIG. 22, with each subsequent window covering members 334 being released sequentially thereafter, as indicated in FIG. 23. During movement of each of the window covering members 334 toward the window covering orientation, the nets N deploy and move so that cargo 400 on that shelf is captured by the net N. Specifically, in FIG. 22, downward movement of the lowest one of the window covering members 334 and upward movement of the nets N cause the cargo 400 to slide into the nets N. As shown in FIG. 23, the cargo 400 has slid into the nets N and the next window covering member 334 and its corresponding net moves to capture cargo, as each net further moves toward a closed position, as shown in FIG. 24 in the window covering orientation.

Figure 24:
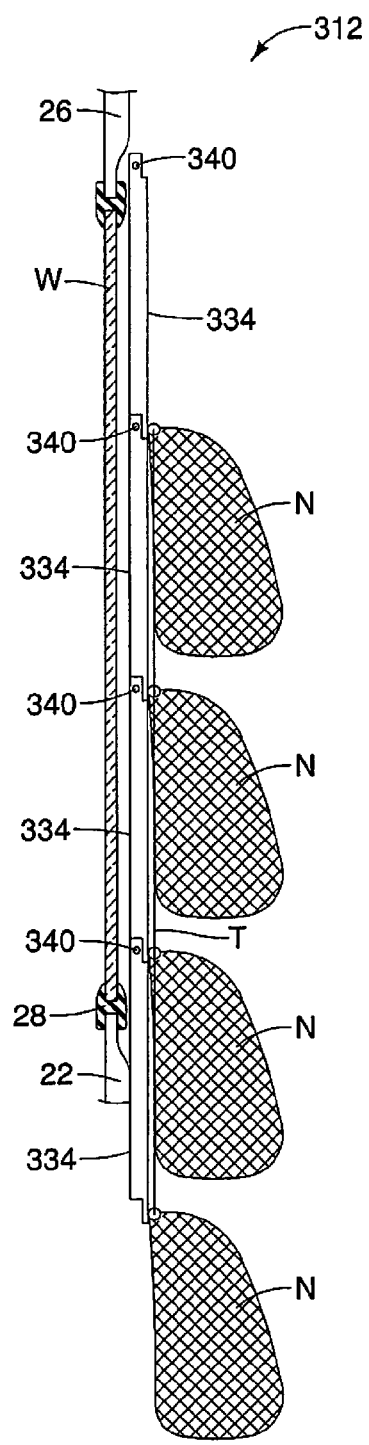
FIG. 24 is still another side view of the window covering assembly depicted in FIGS. 20-23, showing the window covering members in completely moved to the window covering orientation with all of the nets moved from the stowed position to the deployed position in accordance with the modification to the fourth embodiment.

Upper edges of the nets N can include magnets that attract one another after capturing the cargo 400, closing the open upper end of each of the nets N to retain the cargo 400, as shown in FIG. 24.

Fifth Embodiment

Figure 25:
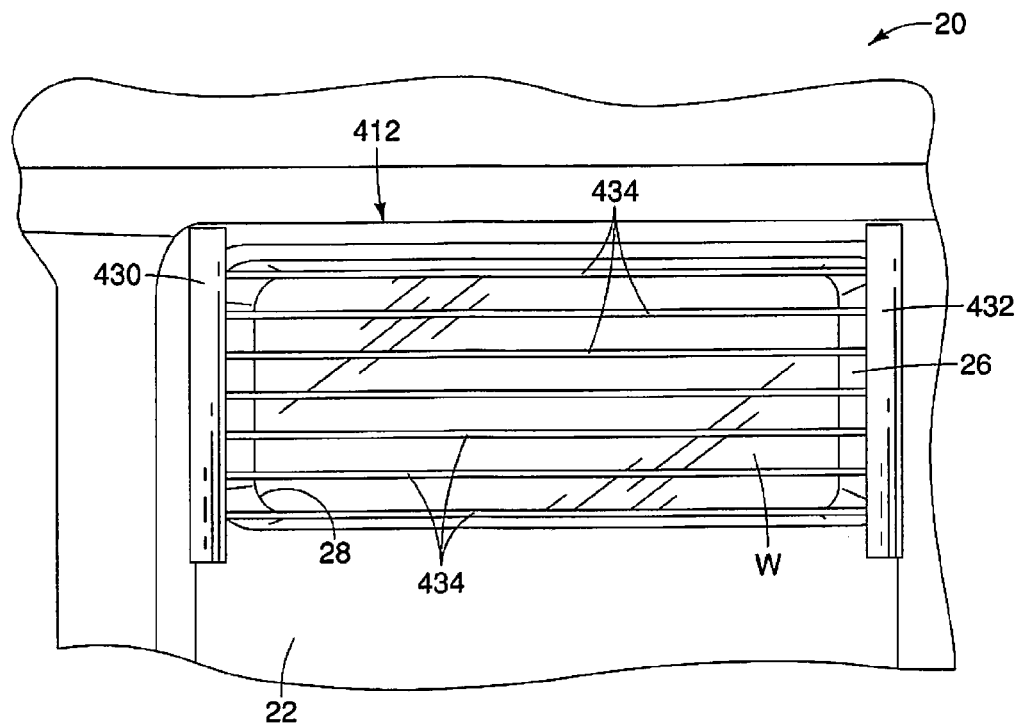
FIG. 25 is a side view of one of the side wall structures within the passenger compartment showing the window opening and a window covering assembly with horizontally oriented window covering members of the window covering assembly in a window exposing orientation in accordance with a fifth embodiment.
Figure 26:
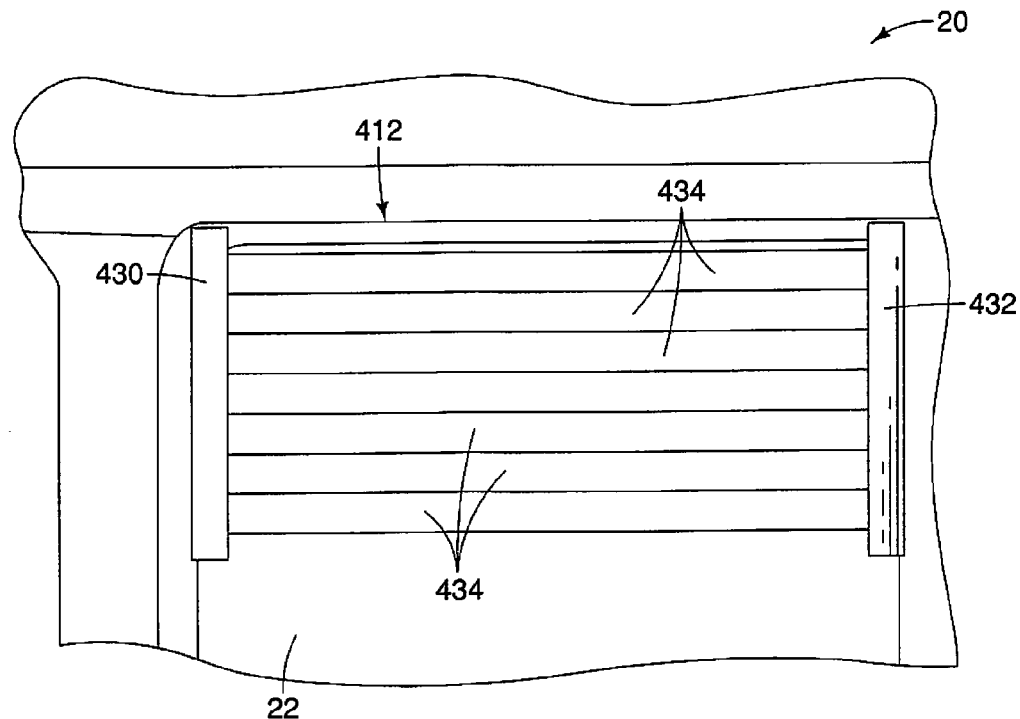
FIG. 26 is another side view of the side wall structure depicted in FIG. 25 showing the window covering members of the window covering assembly moved to a window covering orientation completely covering the window opening in accordance with the fifth embodiment.

Referring now to FIGS. 25-26, a window covering assembly 412 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the window covering assembly 412 includes all of the features of the first embodiment except that each of a plurality of window covering members 434 is a louver extending in a horizontal direction. More specifically, the window covering assembly 412 includes a first support 430, a second support 432 and the plurality of window covering members 434. The first support 430 includes all of the features of the upper support 30 of the first embodiment, except that the first support 430 is dimensioned for mounting to the side wall structure 22 at a first lateral side of the window opening 28. The second support 432 includes all of the features of the lower support 32 of the first embodiment, except that the second support 432 is dimensioned for mounting to the side wall structure 22 at a second lateral side of the window opening 28 opposite the first lateral side.

The window covering assembly 412 includes the control mechanism 36 of the first embodiment, with all of the features of the control mechanism 36 as described above with respect to the first embodiment. In response to detection of an impact event, the control mechanism 36 (not shown) causes the window covering members 434 of the window covering assembly 412 to move from a window exposing orientation (FIG. 24) to a window covering orientation (FIG. 25) in a manner described above with respect to the first embodiment.

The controller 52 preferably includes a microcomputer with a window covering assembly control program that controls the window covering assemblies 12, 112, 212, 312 and 412, as discussed below. The controller 52 can also include other conventional components such as an input interface circuit, an output interface circuit, and storage devices such as a ROM (Read Only Memory) device and a RAM (Random Access Memory) device. The microcomputer of the controller 52 is programmed to control the window covering assemblies 12, 112, 212, 312 and 412. The memory circuit stores processing results and control programs such as ones for window covering member operation that are run by the processor circuit. The controller 52 is operatively coupled to respective ones of the window covering assemblies 12, 112, 212, 312 and 412 in a conventional manner. The internal RAM of the controller 52 stores statuses of operational flags and various control data. It will be apparent to those skilled in the art from this disclosure that the precise structure and algorithms for the controller 52 can be any combination of hardware and software that will carry out the functions of the present invention.

The various vehicle components other that the window covering assemblies 12, 112, 212, 312 and 412 are conventional components that are well known in the art. Since these members and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the window covering assembly. Accordingly, these terms, as utilized to describe the present invention should be interpreted relative to a vehicle equipped with the window covering assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
a side wall having a window opening;
a vehicle impact sensor;
a window covering assembly coupled to the side wall and having a plurality of window covering members extending along the window opening from a first side of the window opening to a second side of the window opening opposite the first side, each of the plurality of window covering members being configured to pivot between a window exposing orientation and a window covering orientation, each of the plurality of window covering members pivoting about a corresponding pivot axis, each of the pivot axes being parallel to one another and located at fixed spaced apart intervals, each of the pivot axes being located along a first edge of the corresponding one of the plurality of window covering members; and
a control mechanism connected to the vehicle impact sensor and to the plurality of window covering members to rapidly move the plurality of window covering members to the window covering orientation in response to detection of a vehicle impact event by the vehicle impact sensor.

2. The vehicle body structure according to claim 1, wherein the control mechanism includes at least one cable coupled to each of the window covering members, the control mechanism being configured to change position of each of the window covering members in response to movement of the at least one cable.

3. The vehicle body structure according to claim 1, wherein the control mechanism includes a plurality of solenoid triggered pins movable from a retaining position in which the solenoid triggered pins retain respective ones of the window covering members in the window exposing orientation and a releasing position in which the solenoid triggered pins are moved away from the window covering members such that the window covering members move to the window covering orientation, the control mechanism being configured to move the solenoid triggered pins from the retaining position to the releasing position in response to the detection of the vehicle impact event by the vehicle impact sensor.

4. The vehicle body structure according to claim 1, wherein the control mechanism is configured to lock the plurality of window covering members in the window covering orientation after moving the plurality of window covering members to the window covering orientation.

5. The vehicle body structure according to claim 1, wherein the control mechanism includes a one-way movement mechanism that triggers movement of the plurality of window covering members to the window covering orientation in response to detection of the vehicle impact event by the vehicle impact sensor.

6. The vehicle body structure according to claim 1, wherein the control mechanism further includes a one-way movement mechanism comprising a pyrotechnic tensioning device that triggers movement of the plurality of window covering members to the window covering orientation in response to the detection of the vehicle impact event by the vehicle impact sensor.

7. The vehicle body structure according to claim 1, wherein the control mechanism includes a user operated controller configured to selectively move the plurality of window covering members between the window exposing orientation and the window covering orientation.

8. A vehicle body structure comprising:
a side wall having a window opening;
a vehicle impact sensor;
a window covering assembly coupled to the side wall and having a plurality of window covering members extending along the window opening from a first side of the window opening to a second side of the window opening opposite the first side, each of the plurality of window covering members being configured to pivot between a window exposing orientation and a window covering orientation; and a control mechanism connected to the vehicle impact sensor and to the plurality of window covering members to rapidly move the plurality of window covering members to the window covering orientation in response to detection of a vehicle impact event by the vehicle impact sensor, the control mechanism including a first portion fixed to the side wall at the first side of the window opening and a second portion fixed to the side wall at the second side of the window opening, the first portion having a first cable fixed to the plurality of window covering members proximate respective first ends thereof and the second portion having a second cable fixed to the plurality of window covering members proximate respective second ends thereof.

9. The vehicle body structure according to claim 8, wherein
each of the plurality of window covering members pivots about a corresponding pivot axis, each of the pivot axes is parallel to one another and located at fixed spaced apart intervals, and each of the pivot axes is centered with respect to the corresponding one of the plurality of window covering members.

10. The vehicle body structure according to claim 8, wherein
the first portion and the second portion include one-way movement mechanisms that move and lock the window covering members to the window covering orientation in response to detecting the impact event.

11. The vehicle body structure according to claim 8, wherein
the first portion includes a first pulley and a first motor operably coupled to rotate the first pulley, and the second portion includes a second pulley and a second motor operably coupled to rotate the second pulley, with a first end of the first cable and a first end of the second cable both being fixed to the first pulley, and a second end of the first cable and a second end of the second cable both fixed to the second pulley.

12. The vehicle body structure according to claim 8, wherein
each of the plurality of window covering members comprises a louver extending in a vertical direction.

13. The vehicle body structure according to claim 8, wherein
each of the plurality of window covering members comprises a louver extending in a horizontal direction.

14. The vehicle body structure according to claim 8, wherein
the control mechanism further comprises a first pulley, a second pulley a user control, a first one-way movement mechanism and a second one-way movement mechanism, with a first end of the first cable being fixed to the first pulley, a second end of the first cable fixed to the second pulley, a first end of the second cable fixed to the second pulley, and a second end of the second cable fixed to the first pulley,
the user control being operably connected to a first motor and a second motor, the first motor being coupled to the first pulley, and the second motor being coupled to the second pulley, the first and second motors being configured to rotate the first and second pulleys respectively to pull the first and second cables respectively to selectively move the window coverings between the window exposing orientation and the window covering orientation in response to signals from the user control, and the first one-way movement mechanism including a third cable with a first end fixed to the first pulley, and a second end fixed to the first one-way movement mechanism, the second one-way movement mechanism including a fourth cable with a first end fixed to the second pulley, and a second end fixed to the second one-way movement mechanism such that the first and second one-way movement mechanisms are configured to pull the third and fourth cables to rotate the first and second pulleys respectively to move and lock the window covering members to the window covering orientation in response to detection of the impact event.

15. A vehicle body structure comprising:
a side wall having a window opening;
a vehicle impact sensor;
a window covering assembly coupled to the side wall and having a plurality of window covering members extending along the window opening from a first side of the window opening to a second side of the window opening opposite the first side, each of the plurality of window covering members being configured to pivot between a window exposing orientation and a window covering orientation, each of the plurality of window covering members extending in a horizontal direction and comprising a shelf such that each of the plurality of window covering members is configured to retain cargo when in the window exposing orientation; and
a control mechanism connected to the vehicle impact sensor and to the plurality of window covering members to rapidly move the plurality of window covering members to the window covering orientation in response to detection of a vehicle impact event by the vehicle impact sensor.

16. The vehicle body structure according to claim 15, wherein
each of the plurality of window covering members includes a net movable from a retracted orientation to a cargo catching orientation such that when each of the window covering members is in the window exposing orientation, the corresponding net is in the retracted orientation, and when each of the plurality of window covering members moves to the window covering orientation, the corresponding net moves to the cargo catching orientation.

17. The vehicle body structure according to claim 15, wherein
the control mechanism includes a plurality of solenoid triggered pins that retain corresponding ones of the plurality of window covering members in the window exposing orientation, and in response to detection of the vehicle impact event by the vehicle impact sensor the control mechanism operates the plurality of solenoid triggered pins to release the plurality of window covering members such that the plurality of window covering members move to the window covering position.

18. The vehicle body structure according to claim 17, wherein
each of the plurality of window covering members pivots about a corresponding pivot axis located along a first edge of a corresponding one of the plurality of window covering members, and each of the plurality of solenoid triggered pins is configured to engage a second edge of the corresponding one of the plurality of window covering members.

* * * * *